Patented Oct. 18, 1949

2,485,146

UNITED STATES PATENT OFFICE 2,485,146

MANUFACTURE OF CHLORO CRESOXY ACETIC ACID

Reginald Thomas Foster, Birkenhead, England, assignor to Imperial Chemical Industries Limited, a corporation of Great Britain No Drawing. Application July 25, 1945, Serial No. 607,086. In Great Britain April 21, 1943

Section 1, Public Law 690, August 8, 1946
Patent expires April 21, 1963

1 Claim. (Cl. 260—521)

This invention relates to improvements in the manufacture of organic compounds and more particularly to the manufacture of derivatives of chlorocresol.

It has been proposed to prepare haloaryloxyacetic acids by refluxing a mixture of an alkyl-(halohydrocarbon substituted)-phenate, sodium chloroacetate and water, and thereafter separating the desired haloaryloxyacetic acid product from the reaction mixture. In preparing derivatives of the chlorocresols in this way the parent chlorocresol has to be made by chlorinating the cresol, for example as described in co-pending application Serial No. 607,084, and subsequent fractionation of the chlorinated cresol is necessary to obtain any particular isomer. The fractionation is a troublesome and time-consuming process.

According to the present invention a process for the production of methylchlorphenoxyalkylcarboxylic compounds comprises chlorinating a cresol in the absence of a solvent so as to produce a nuclear chlorinated cresol, and subsequently reacting the resultant crude chlorinated product with an α haloalkylcarboxylic acid in the presence of a base.

The method of the present invention has the advantage over earlier processes that the troublesome steps of isolating the intermediate chlorocresol from by-product impurities are avoided without adverse effect on the yield of the methylchlorophenoxyalkylcarboxylic compounds. Indeed it has been found that it is possible to obtain an enhanced yield of the product, for the normal method of preparation involves a fractional distillation, and it appears that during that step some decomposition of the crude chlorocresol takes place.

The chlorination of the cresol is conveniently carried out by passing chlorine into molten cresol at an elevated temperature as fast as it reacts with the cresol until the gain in weight of the cresol corresponds to the formation of a compound containing approximately 1 atom of chlorine per molecule, and suitably between 1.0 and 1.2 atoms of chlorine per molecule. Under such conditions nuclear chlorination occurs, and when p-cresol is so chlorinated only one isomer is formed, namely, 2-chloro-p-cresol. However, if o-cresol is so chlorinated nuclear chlorination occurs with the formation of both 4-chloro-o-cresol and 6-chloro-o-cresol. After the subsequent reaction of the crude chlorinated material with an α haloalkylcarboxylic acid a single compound will thus be formed where the starting material is p-cresol. Thus by reacting the chlorinated p-cresol with monochloroacetic acid 4-methyl-2-chlorophenoxyacetic acid or a derivative thereof results. On the other hand when the starting material is o-cresol subsequent reaction with the α haloalkylcarboxylic acid will yield a mixture of two isomeric methylchlorophenoxyalkylcarboxylic acids; thus reaction with monochloroacetic acid will yield both 2-methyl-4-chlorophenoxyacetic acid and 2-methyl-6-chlorophenoxyacetic acid or derivatives of these. In such a case the mixed acids or compounds may be removed together from the reaction mixture and, if desired, separated subsequently by any suitable means, as for example fractional crystallisation.

The step of reacting the chlorinated cresol with the α haloalkylcarboxylic acid, for example monochloroacetic acid, is conveniently carried out by mixing the chlorocresol with approximately an equimolecular amount of the monochloroacetic acid, calculated on the original amount of cresol used, and a solution of caustic soda is then added in such amount as to make the reaction mixture alkaline. The whole is then heated under reflux for several hours, for example 4 to 6 hours, whereby reaction between the chlorocresol and the monochloroacetic acid occurs. At the end of the heating period the reaction mixture may be allowed to cool and the resultant methylchlorophenoxyacetic compound may be isolated. On cooling, the mixture deposits solid material, which is essentially the sodium salt of the acid, and if desired, the sodium salt may be obtained by isolating this solid material from the cold reaction mixture and drying it. Alternatively, the acid itself may be recovered by acidifying the hot reaction mixture with a mineral acid, for example, hydrochloric acid or sulphuric acid, and after cooling, isolating the acid which separates from the reaction mixture. The acid may either be isolated by decantation or filtration or it may be extracted with a solvent such as ether. The resultant acid may be purified by recrystallisation, or it may be converted into other compounds. Thus it may be converted to an alkyl ester by treatment with an aliphatic alcohol in the presence of concentrated sulphuric acid or hydrochloric acid. Typical esters which may be made in this way include, for example, the methyl, ethyl, propyl, isopropyl, butyl, and isobutyl esters. Salts of the acid may also be obtained by neutralising the acid with a suitable base, or by double decomposition between a soluble salt of the acid and a soluble salt of the base. Thus, for example, alkali metal and alkaline earth metal salts or the zinc, mercury, ferric, or lead salt may be so made.

Instead of reacting the chlorinated cresol with monochloroacetic acid it may be reacted with other α haloalkylcarboxylic acids. Examples of such acids are, for example, α chloropropionic acid, α bromobutyric acid, and α chloroisobutyric acid. Similarly instead of using caustic soda as the base by means of which the condensation is effected other alkali metal hydroxides and also alkaline earth metal hydroxides may be used. It is also possible to carry out the condensation by means of the alkali metal carbonates and also the alkaline earth metal carbonates. Basic compounds of other metals may also be used.

The following examples illustrate but do not limit the invention, all parts being parts by weight.

Example 1

Chlorine was passed into 200 parts of p-cresol as fast as it was absorbed until the increase in weight of the reaction mixture was 70 parts, corresponding to the combination with the cresol of 1.1 atoms of chlorine per molecule.

The temperature was allowed to rise to 100° C. The crude chlorinated material was then refluxed for 4 hours with 178 parts of monochloroacetic acid and a solution of 170 parts of caustic soda in 540 parts of water. The reaction mixture was then diluted with 540 parts of water and hydrochloric acid was added until the liquid was strongly acid, whereby crude 4-methyl-2-chlorophenoxyacetic acid was precipitated. The crude acid was dissolved in ether and the resultant solution extracted with aqueous sodium bicarbonate and the aqueous liquid then acidified to precipitate the phenoxy acid. On drying this precipitated acid at 80° C., 200 parts of anhydrous acid, M. P. 126° C. to 127° C. were obtained.

After further crystallisation from toluene the melting point was raised to 137° C. A sample of acid prepared from pure 2-chloro-p-cresol had the same melting point and so did a mixture of this acid and the acid prepared above, thus demonstrating the identity of the latter.

20 parts of the acid crystallised from toluene were dissolved in 32 parts of methanol, and 14.8 parts of concentrated sulphuric acid were added. An oily layer of the methyl ester separated. After allowing the mixture to stand for several hours 200 parts of water were added and the oily layer was separated, dried, and distilled at 3 mm. pressure. 17.5 parts of methyl 4-methyl-2-chlorophenoxyacetate were thus obtained boiling at 133° C. to 135° C./3 mm.

Example 2

Chlorine was passed into o-cresol at a temperature of 100° C. until 1 atom of chlorine per molecule had combined with the cresol. 200 parts of the crude chlorinated o-cresol were mixed with 132 parts of monochloroacetic acid and a solution of 123.5 parts of caustic soda in 495 parts of water. The mixture was heated under reflux for 3 hours. Sufficient concentrated hydrochloric acid was then added to the hot reaction mixture to render it acid to Congo red, the reaction mixture being stirred during the addition. A liquid mixture of 2-methyl-4-chlorophenoxyacetic acid and 2-methyl-6-chlorophenoxyacetic acid separated out from the reaction mixture as a lower layer and the upper aqueous layer was then decanted off and allowed to cool. A further 27 parts of crude mixed acid crystallised out from this separated aqueous layer on cooling. The whole of the crude acid was washed with 100 parts of water at 50° C., the washed liquor removed by decantation and the acid dried at 100° C. 240 parts of dry crude acid were thus obtained.

I claim:

In a process for the production of 2-methyl-4-chlorophenoxyacetic acid, the steps comprising heating monochloroacetic acid under reflux for about four to six hours with a crude chlorinated cresol obtained by passing chlorine into molten ortho-cresol until the gain in weight of the ortho-cresol corresponds to the formation of a compound containing about 1.0 to 1.2 atoms of chlorine per molecule of ortho-cresol, said heating being carried out in the presence of caustic soda in such amount as to make the reaction mixture alkaline, and said monochloroacetic acid being used in about equimolecular amount based on the ortho-cresol used in preparing the crude chlorinated cresol, then acidifying the reaction mixture with a mineral acid, and separating the resulting crystalline product.

REGINALD THOMAS FOSTER.

REFERENCES CITED

The following references are of record in the file of this patent:

UNITED STATES PATENTS

| Number | Name | Date |
|---|---|---|
| 2,303,337 | Dohrn et al. | Dec. 1, 1942 |
| 2,343,547 | Gordon | Mar. 7, 1944 |

FOREIGN PATENTS

| Number | Country | Date |
|---|---|---|
| 232,071 | Germany | Mar. 4, 1911 |

OTHER REFERENCES

Walther et al., Beilstein (4th. ed.), (1931), vol. 6, Suppl. pp. 188–189.

Pokorny, Jour. Am. Chem. Soc., vol. 63, page 1768, (1941).